United States Patent

[11] 3,536,026

| [72] | Inventor | Kenneth F. Miller<br>Riverside, California |
|---|---|---|
| [21] | Appl. No. | 719,443 |
| [22] | Filed | April 8, 1968 |
| [45] | Patented | Oct. 27, 1970 |
| [73] | Assignee | Atco Products Incorporated<br>a corporation of California |

[54] TIRE PRESSURE INDICATOR
5 Claims, 10 Drawing Figs.

[52] U.S. Cl. ............................................... 116/34,
73/146.3, 137/227
[51] Int. Cl. ....................................................... B60c 23/02
[50] Field of Search ........................................... 116/34, 65,
70; 73/146.2, 146.3, 146.8, 419; 137/223, 155,
227, 228, 230, 419; 92/85

[56] References Cited
UNITED STATES PATENTS

| 1,279,078 | 9/1918 | Bowden | 73/419 |
|---|---|---|---|
| 1,451,307 | 4/1923 | Schweinert et al. | 73/419 |
| 1,482,237 | 1/1924 | Lent | 137/227 |
| 1,731,632 | 10/1929 | Main | 116/34 |
| 2,334,095 | 11/1943 | Hoghaug | 116/34 |
| 2,903,888 | 9/1959 | Gfoll | 73/146.8 |
| 2,906,282 | 9/1959 | Shannon | 137/228 |
| 2,948,256 | 10/1960 | Tapp | 116/34 |
| 2,992,653 | 7/1961 | Patterson | 137/228 |
| 3,131,667 | 5/1964 | Sajeck | 116/70 |
| 3,357,240 | 12/1967 | Bordwick | 73/146.8 |

*Primary Examiner*—Louis J. Capozi
*Attorney*—Fritz B. Peterson

ABSTRACT: A tire pressure indicator of simple construction composed essentially of a cylinder, a valve stem seal, a piston and spring, and a keeper, the assembly of which is reduced to seating the seal, inserting the piston and spring into the cylinder, and affixing the keeper In a modified form the indicator need not be removed from the valve stem when air is to be introduced into the tire.

Patented Oct. 27, 1970
3,536,026
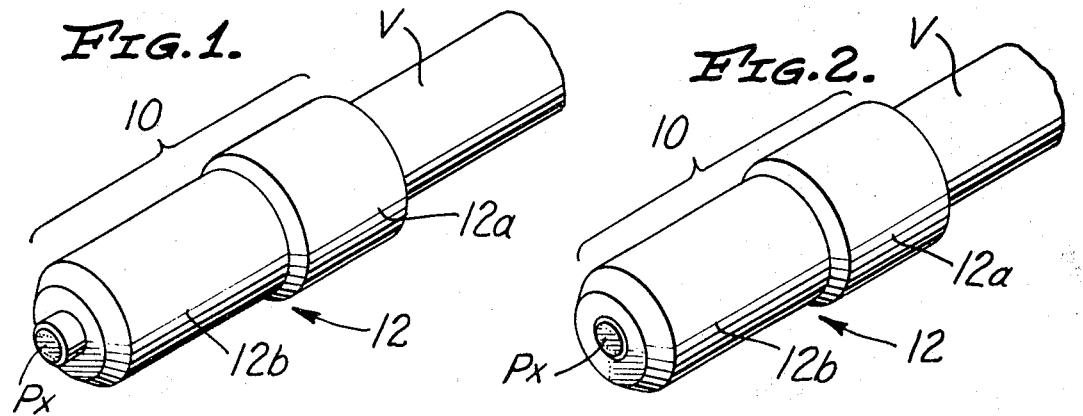
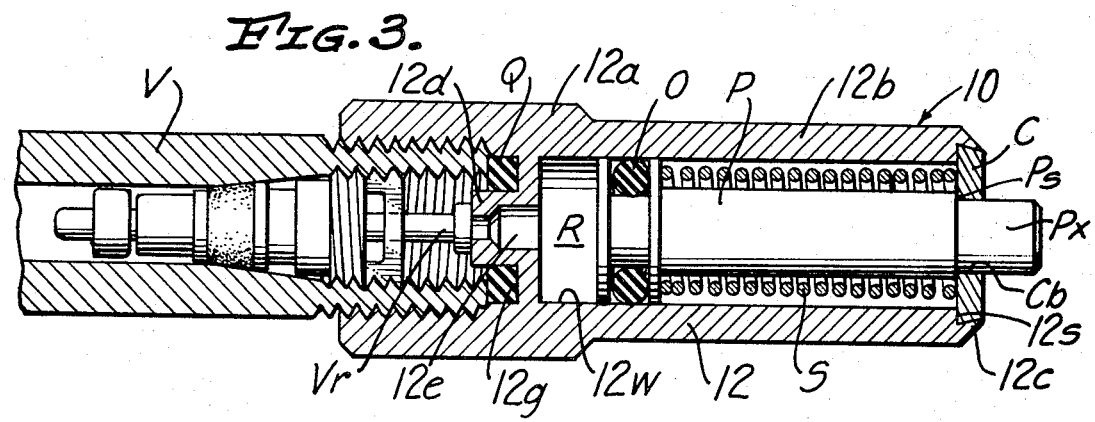
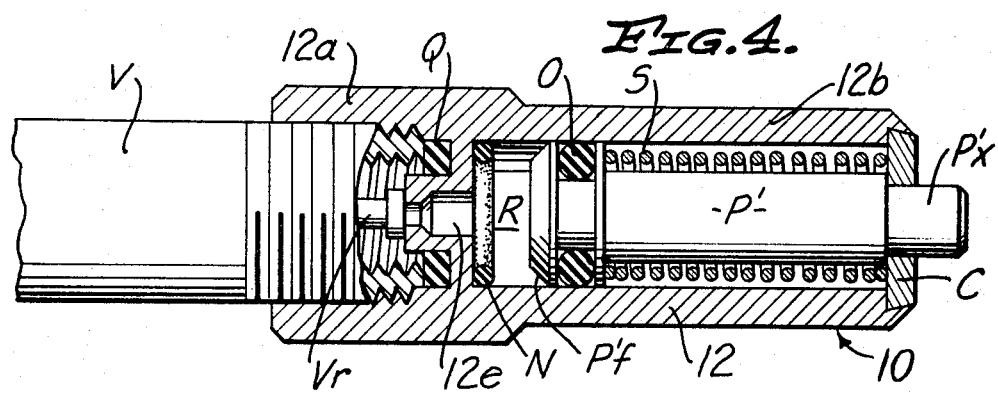
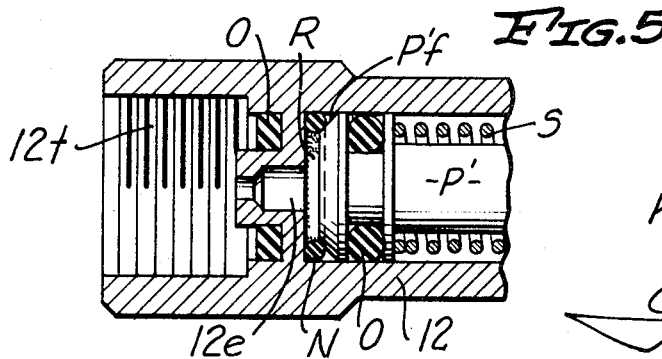
INVENTOR
KENNETH F. MILLER
BY

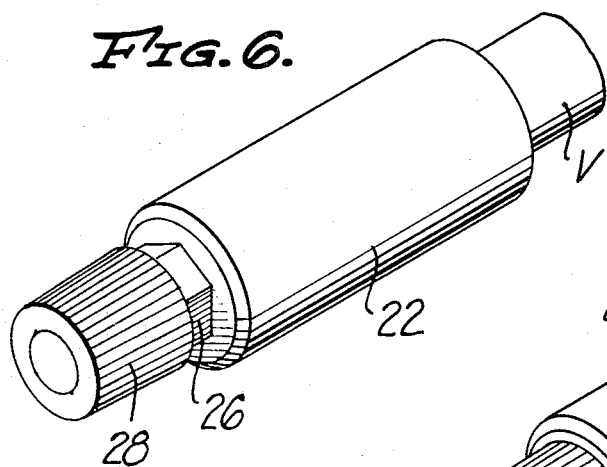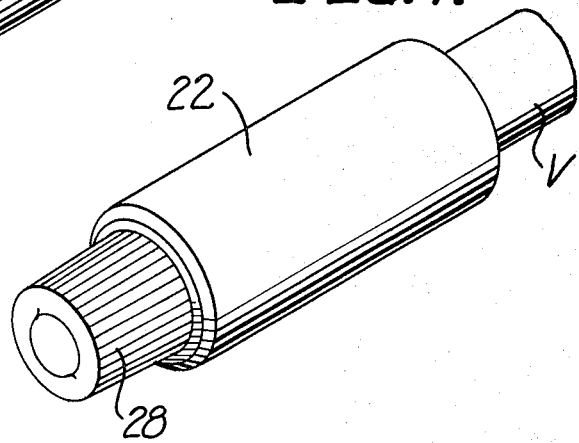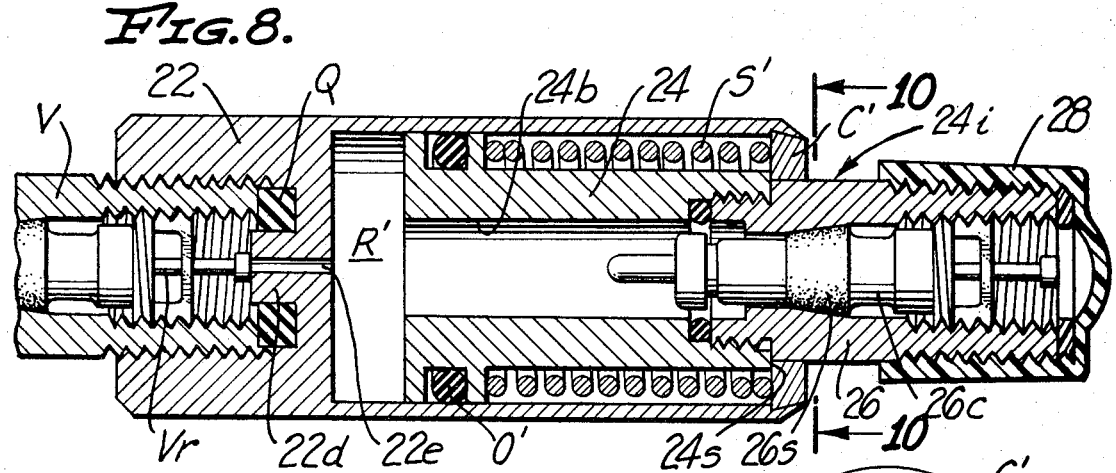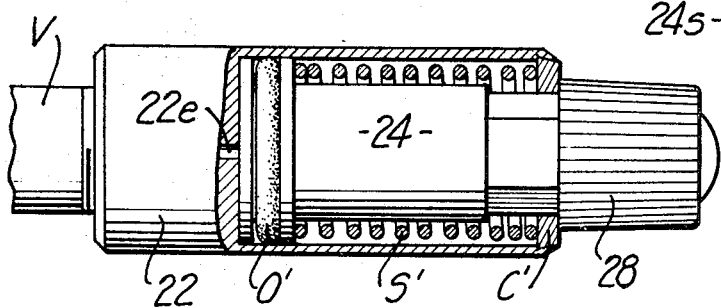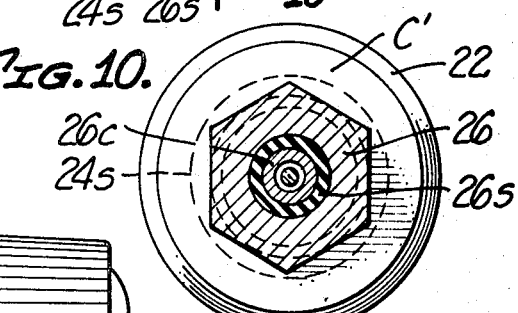

TIRE PRESSURE INDICATOR

Among prior art tire pressure indicators are those described in U.S. Pats. to Bordwick, No. 3,357,240; to Tapp, No. 2,948,256; to Sajeck, No. 3,131,667; to Main, No. 1,731,632; to Shannon, No. 2,906,282; and to Patterson, No. 2,992,653. The extensive prior art, dispersed over an extended period of time, is indicative to some extent of the need for a device to provide an indication of the pressure of the air in a pneumatic tire, relative to the ambient air. The advent of heavy high-speed motor freight transport has intensified the need for an effective trouble-free device of the noted character, capable of furnishing at a glance a reliable indication that the pressure of the air in a tire is in excess of a prescribed determined value.

It is significant that despite the widespread desire for a reliable device effective to indicate tire pressure above a determined minimum and to indicate that the pressure has decreased to a value below that determined value, no such device has yet gained widespread commercial acceptance. Some, following introduction to the market, have proved to be unreliable. Others, due to defective arrangement of parts, have actually permitted steady leaking of air from the tire, causing a great amount of trouble and inconvenience. Still others, due to complexity of construction and difficulty of assembly, have been unreliable, or too expensive to be practical. It is a primary object of the present invention to provide a tire pressure indicator which overcomes all of the noted undesirable features of the prior art devices of its class, which is inexpensive and easy to manufacture, and which is infallibly effective to function to indicate by one positional status that the pressure of the air in the tire to which it is applied is above a desired prescribed minimum value, and by a second positional status, that the pressure has decreased to a value below that prescribed minimum value.

The noted primary object, and others which will hereinafter be set forth or made evident in the appended claims and following description of preferred physical forms of the indicator, are attained by the invention. The description has reference to the appended drawings forming a part of this specification, in which drawings:

FIG. 1 is a pictorial view of an exemplary device according to the invention, applied to a tire valve stem, with the indicating means in the noted first positional status, indicating tire pressure in excess of the determined minimum value, the drawing being on enlarged scale;

FIG. 2 is a view similar to FIG. 1, but showing the indicating device in the second positional status or attitude and thereby indicating tire pressure less than the determined desired minimum value;

FIG. 3 is a longitudinal sectional view of the structure depicted in FIG. 1 and 2, to a larger scale, showing internal parts and details partly in section;

FIG. 4 is a view similar to FIG. 3, showing a "fail-safe" modified form of the device depicted in FIGS. 1;

FIG. 5 is a fragmentary view of a portion of the indicator shown in section in FIG. 4, with the indicator piston in the low-pressure attitude or position;

FIGS. 6 and 7 are views similar to FIGS. 1 and 2, respectively, but depicting a more sophisticated form of indicator according to the invention;

FIG. 8 is a view similar to FIG. 3 but showing a longitudinal sectional view of the indicator depicted in FIGS. 6 and 7 with the indicating device or means in the normal-pressure status indicating tire pressure in excess of the determined desired minimum or critical value, the scale of the drawing being somewhat larger;

FIG. 9 is a fragmentary view partly in section, showing relative positions of some parts of the device depicted in FIGS. 6, 7, and 8 when the indicating device is in the second or low-pressure position or attitude and indicating tire pressure less than the determined minimum value; and FIG. 10 is a transverse sectional view of the structure shown in FIG. 9, taken as indicated at line 10–10 in the latter drawing.

Referring to FIGS. 1, 2, and 3, the indicator 10, comprises a simple one-piece easily-machined generally-cylindrical body 12 having an inner end 12a the interiorly threaded portion of which is adapted to receive the threaded outer end of a valve stem V of a tire or like device containing air or gas under pressure, the body 12 further having an outer end 12b formed as a cylinder having a smooth interior bore 121w. Disposed in the bore is a piston P the head of which is annularly grooved to receive an O-ring seal O, and the outer end of which carries an indicator device $P_x$ which is of reduced diameter and arranged to reciprocate with a close sliding fit in a complementary bore $C_b$ in a cap C. Indicator device $P_x$ is preferably made as an integral part of the piston P. The cap C is provided with a beveled periphery which seats as shown in an annular step bore or groove 12s formed in the outer end of body 12b. The cap is retained in place by the radially inwardly swaged peripheral lip 12c formed by the beveled outermost end portion of the cylinder as indicated in FIG. 3.

Continuing with reference to the noted drawings, the piston P is urged inwardly of the cylinder by a selected spring S the inner end of which bears on the head of the piston and the outer end of which bears on cap C. The constant and other mechanical characteristics of the spring are selected so that the piston will move outwardly and compress the spring when the pressure in the chamber R at the lower end of the cylinder materially exceeds a selected determined value herein termed the critical pressure. Thus, when the pressure in chamber R falls below that determined or critical value, spring S acts to force the piston inwardly until the latter bottoms on the end wall of the cylinder. During inward and outward translations of the piston, the O-ring seal is effective to prevent leakage of air past the head of the piston.

When the indicator 10 is attached to a tire valve stem by turning with engagement of the complementary threads, an annular resilient seal Q (FIG. 3) which is seated and retained in an annular internal groove or seat 12g formed in the interior of body 12 as indicated is brought into compressive sealing relationship with the outer end face of the valve stem V. Concurrently a valve core depressor 12d preferably formed as an integral part of body 12 is moved into the end of the valve stem and into depressing contact with the outer end of the valve core rod $V_r$. Thus as the seal Q becomes effective, depressor 12d depresses rod $V_r$ of the valve and permits escape of air through the valve into chamber R via one or more passages or bores such as 12e formed through depressor 12d.

As is made evident by the preceding description, and assuming the tire to which valve V is an adjunct to be inflated to the desired operating pressure, application of the indicator 10 to the valve stem results in depression of the valve core rod V and the escape into sealed chamber R of air sufficient to drive the piston outwardly to a limit position at which a step $P_s$ on the piston engages the inner face of cap C. Thus the appropriately colored indicator device $P_x$ formed by the outer end portion of the piston is brought into an exposed position wherein it is visible, as indicated in FIG. 3. Thereafter if due to a puncture or other leak in the tire the tire pressure decreases to the critical value below which it is desired that the tire be not operated, spring S becomes effective to move the piston inwardly and thus to remove the indicating device $P_x$ carried by the piston into the cylinder and bore $C_b$ of cap C, and out of view of an observer. Thus an observer is provided an unambiguous indication of whether the pressure within the tire is above, or below, the selected or critical value.

As is further evident, the dimensions and constant of spring S, with a prescribed cylinder diameter (piston face diameter) may be selected for inward movement of the piston P incident to reduction of pressure in chamber R to a value just below any specified critical value. Hence the indicator device may be readily manufactured for each of a series of determined critical pressure values, only the springs S being required to be different for indicators effective for the respective different critical pressure values. Further, since observation or inspection of the device will occur only with the tire stationary, centrifugal and other normal operating forces and vibration will not adversely affect the functioning of the indicator for the intended purpose.

Additionally it is evident that the indicator device as described is simple, comprising only simple easily manufactured parts that are easily and inexpensively assembled. Further, due to the construction, in which the piston is assembled from and into the outer end of the body, whereby the body can be a single integral leakproof cylinder or the like, no air can escape from chamber R through assembled joints. Hence, unintended deflation of a tire is avoided.

Referring next to FIGS. 4 and 5, there is illustrated a modified form of the pressure indicator incorporating a "failsafe" feature. Therein, the principal parts of the device are identical or similar to those depicted in FIG. 3, with the exception of the piston P'. The latter member is similar to the previously described piston P but is provided with a head having a thicker inner end which is peripherally beveled as indicated to provide an annular beveled face P'f. Further, the modified form of indicator comprises an annular resilient seal member or ring N seated at the lower interior end of the cylinder and positioned to be contacted by the beveled face P'f when the piston is driven inwardly by spring S. The seal ring N cooperates with the annularly beveled periphery of the end face of the piston to form a secondary seal effective to preclude passage of air, as indicated in FIG. 5. Thus this secondary seal is operative to prevent escape of air via chamber R after the pressure in the chamber decreases below the selected critical value, if, for example, for some reason the O-ring seal O is damaged and the outer or primary seal becomes faulty. In other respects the indicator depicted in section in FIGS. 4 and 5 is made operative and functions in the same manner as described in connection with the device depicted in FIGS. 1, 2, and 3, the indicator device P'x at the outer end of the piston extending outwardly from cap C and into view as indicated in FIG. 4 when the tire pressure is above the critical pressure, and being withdrawn inwardly out of view incident to the pressure falling to a value below that pressure.

In FIGS. 6, 7, 8, and 9 there is illustrated a modified form the indicator which permits inflation or reinflation of the tire without removal of the device from the valve stem V. Therein the indicator, denoted generally by number 20, comprises a cylindrical body 22, an inner valve stem seal Q, a piston 24, a spring S', a cap C', and an indicator device comprising a secondary air valve device 26 having a valve core 26c, and a dust cap 28. Piston 24, spring S', seal Q, cap C', seal ring O', and body 22 may be like or similar to the corresponding parts previously described, and are employed and function in the manners previously explained or made evident; however the piston is provided with a shaped through-bore 24b which is normally closed by the secondary valve device 26 comprised in the indicating device and thus forms an extension of chamber R' and permits entry of air under pressure through the outer or secondary valve device. Valve device 26 may be produced as an integral extension of piston 24, but preferably is produced as a separate device as will now be described.

As is made evident in FIG. 8, valve device 26 is similar to the outer end portion of an ordinary tire valve. The inner threaded end of device 26 is turned into an internally threaded outer end portion of the piston 24 as shown and the juncture sealed air tight. The valve device 26 comprises a core 26c and a valve core plug seal 26s which seats on the complementary tapered or conical portion of the wall of the bore formed through member 26. In other respects this outer secondary valve means functions as an ordinary tire valve. A dust cap 28 protects the outer valve from entry of foreign material in an evident manner. Following removal of the dust cap, air under pressure may be admitted to the tire by applying the conventional air hose chuck to the outer end of piston 24, and air may be admitted whether the piston 24 is at its inner position or outwardly thereof. Since the depressor 22d of the indicator body 22 depresses the inner or primary tire valve core rod Vr and has one or more passages or bores such as 22e therethrough, the chamber R' at the bottom or inner end of the cylinder is in direct communication with the interior of the tire to which the indicator is attached, and the tire pressure is effective on the piston over an area equal to the cross section of the cylinder.

As in the previously described forms of the indicator, when the tire pressure exceeds the selected critical value the piston 24 is forced outwardly to a normal limit position determined by engagement of the annular step 24s with the cap C', whereby a peripheral surface 24i on the indicator device is exposed to view and gives a visual indication that the tire pressure is above the critical minimum value. By suitably coloring the indicator device at surface 24i, the effectiveness of the indication may be enhanced. As is evident, when the tire pressure falls below the selected critical value, spring S' forces the piston inwardly until dust cap 28 is brought against cap C', whereby the outer indicating surface 24i is hidden from view and whereby the indicator provides an indication of the low-pressure condition of the tire. If the indicator is made integral with the piston 24, application and removal of the dust cap 28 may be facilitated by application of lateral force on the protruding portion of the piston which is effective to prevent rotation of the piston during application and removal of the dust cap.

It is made evident by the drawings and the preceding description of the presently preferred form of the invention that since the seat formed in the interior of the indicator body for reception of seal member Q may easily be precisely and accurately formed and a complementary strong resilient annular seal member Q disposed therein, assurance is attained that the only exit for air from the valve stem V is via the passage or passages in the depressor and into chamber R (or R'); and that no air can leak through a juncture between first and second portions of the indicator body, since the body is an integral one-piece cylindrical member. Further, by arrangement of the parts such that the piston and piston spring are assembled into and from the outer end of the body, the latter can be a one-piece member and of easily-produced form. Also, assembly of the indicator is thus made to be extremely simple and involving principally the placement of seal member Q in the recess or seat, application of the O-ring and spring on the piston and entry of the piston assembly into the cylinder, pressing and holding cap C into place and swaging-in of the tapered lip at the outer end of the cylinder portion of the body. In the case of the "fail-safe" construction of FIGS. 4 and 5, the additional simple assembly operation of inserting ring seal N into place is involved; and in the case of the indicator shown in FIGS. 8 and 9, the additional simple operations of turning in the indicator device with valve device 26 and application of the dust cap are involved. As is also made evident in the drawings, all of the parts of the indicator are of simple form, easily and economically produced with automatic machinery. Thus it is evident that the objects of the invention have been attained.

I claim:

1. A tire pressure indicator effective to provide distinctive respective indications of the pressure in a tire when the pressure is in excess of a selected critical value and when the pressure falls to a value below that critical value, said comprising:

a one-piece integral rigid body having first and second hollow cylindrical end portions separated by an integral transverse interior wall with a cylinder formed in said first portion, said second portion having an interiorly threaded annular wall forming a chamber and adapted to be turned tightly onto a tire valve stem, said transverse interior wall and said annular wall shaped to form an annular recess at the interior extremity of said chamber and said transverse interior wall being perforated to form a passageway for passage of gas between the interiors of said first and second hollow cylindrical portions and further shaped to depress the valve core rod of a tire valve stem onto which the indicator is turned;

an annular seal seated in said annular recess and constructed and arranged to be compressively urged to the bottom of said recess by the outermost end face of a tire valve stem onto which the indicator is turned;

piston means having a head reciprocably disposed in said cylinder and positively prevented from entry into said chamber by said transverse interior wall;

an apertured cap means having a beveled periphery seated in an annular notched recess in the outer end of said second portion to form an apertured outer end wall of said cylinder and effective to confine said piston head in said cylinder and restricting the extent of outward movement of said piston means, and an indicator device carried by said piston means and movable therewith in the aperture of said cap means to an exposed first position outside said cylinder and to a second position within said cylinder;

seal means providing a seal between said piston and the interior wall of said cylinder;

spring means in said cylinder effective to urge said piston inwardly against the pressure of air in said passage and effective incident to fall of pressure in said passage to a value below said critical value to move said piston inwardly and said indicator device to said second position, said spring selected to compress and permit outward movement of said piston by air under pressure when the pressure in said passage is in excess of the selected critical value to carry said indicator device to said first position; and said spring means exerting force on said cap means, and the end of said body being secured to the periphery of said cap means to retain said spring and piston in said cylinder.

2. An indicator as defined in claim 1, including an annular resilient seal disposed between the inner end of said piston and the inner end of said cylinder to form an airtight seal effective when said piston is in said second position to prevent passage of air past the periphery of said piston into the outer end of said cylinder.

3. An indicator as defined in claim 1, including a secondary valve device carried by said piston, said piston having an air passage therethrough in communication with the ambient atmosphere outside said indicator through said secondary valve device, whereby air under pressure may be admitted to the tire without removal of said indicator from the valve stem of the tire.

4. An indicator as defined in claim 3, in which the aperture in said cap means is noncircular and in which said indicator device has a portion of complementary cross section reciprocable in said aperture, whereby to prevent relative rotation between said piston means and said body.

5. A tire pressure indicator comprising:

body means having a first end portion having a first chamber therein for reception and attachment to the end of a tire valve stem, said body means having a second end portion having a cylindrical chamber therein forming an elongate cylinder having an inner end and an outer end and a cylinder wall, said body means having a transverse wall portion between said chambers integral with said cylinder wall and said transverse wall portion having an air passage interconnecting said first chamber and the inner end of said cylindrical chamber;

a piston device in said cylinder, arranged for reciprocatory movement therein and having sliding sealing engagement with the cylinder wall, said body having means restricting motion of said piston between an inward limit position and an outward limit position, and said piston device carrying an indicator means movable with said piston between an inward position in which it is concealed in said body means and an outward position in which it is exposed to view outside said body means;

spring means effective to urge said piston device toward said inward limit position when the air pressure in said inner end of said cylinder is below a selected value and effective to permit air under pressure in excess of said value in said passage to move said piston device to said outward limit position;

said body means having means to depress a tire valve core rod to release air from a tire to a valve and which tire said body means is adapted to be attached; and an auxiliary seal device disposed in said cylinder between said first chamber and the periphery of said piston and arranged to effect a seal preventing escape of air between said piston and said cylinder wall when said piston means is urged to said inward limit position, whereby upon decrease of pressure in said passage means below said selected value a secondary seal is effected to prevent escape of air between said piston device and said cylinder wall to provide a "fail-safe" indicator